United States Patent
Xiong et al.

(10) Patent No.: US 11,740,611 B2
(45) Date of Patent: Aug. 29, 2023

(54) ACCELERATION CONTROL METHOD FOR LOAD ON POWERED BACKPACK BASED ON DISTURBANCE OBSERVER

(71) Applicant: HUAZHONG UNIVERSITY OF SCIENCE AND TECHNOLOGY, Hubei (CN)

(72) Inventors: Cai-Hua Xiong, Hubei (CN); Qin-Hao Zhang, Hubei (CN); Lei He, Hubei (CN); Chuang Liu, Hubei (CN); Wen-Bin Chen, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 739 days.

(21) Appl. No.: 16/903,363

(22) Filed: Jun. 16, 2020

(65) Prior Publication Data
US 2021/0333778 A1 Oct. 28, 2021

(30) Foreign Application Priority Data

Apr. 26, 2020 (CN) .......................... 202010340731.6

(51) Int. Cl.
*G05B 19/416* (2006.01)
*A45F 3/04* (2006.01)
*G05B 13/04* (2006.01)

(52) U.S. Cl.
CPC .............. *G05B 19/416* (2013.01); *A45F 3/04* (2013.01); *G05B 13/042* (2013.01); *G05B 2219/43019* (2013.01)

(58) Field of Classification Search
None
See application file for complete search history.

(56) References Cited

U.S. PATENT DOCUMENTS

2020/0368094 A1* 11/2020 Yoshimi ................. A61H 1/024

FOREIGN PATENT DOCUMENTS

EP 3841916 * 6/2021 .............. A45F 3/08

* cited by examiner

*Primary Examiner* — Sean Shechtman
(74) *Attorney, Agent, or Firm* — JCIP Global Inc.

(57) ABSTRACT

The disclosure belongs to the technical field of powered drive devices, and discloses an acceleration control method for a load on a powered backpack based on a disturbance observer. The method includes: S1 setting the desired acceleration of the load on the powered backpack, presetting the initial motor drive current that regulates the movement of the load according to the desired acceleration, measuring the actual acceleration of the load; S2 establishing the disturbance observer for controlling acceleration the load on the powered backpack, using the disturbance observer to calculate the motor drive current that makes the actual acceleration of the load equal to the desired acceleration, so as to realize the acceleration control of the load on the powered backpack.

7 Claims, 3 Drawing Sheets

ACCELERATION CONTROL METHOD FOR LOAD ON POWERED BACKPACK BASED ON DISTURBANCE OBSERVER

CROSS-REFERENCE TO RELATED APPLICATION

This application claims the priority benefit of China application serial no. 202010340731.6, filed on Apr. 26, 2020. The entirety of the above-mentioned patent application is hereby incorporated by reference herein and made a part of this specification.

BACKGROUND

Technical Field

The disclosure belongs to the technical field of powered drive devices, and more specifically, relates to an acceleration control method for a load on a powered backpack based on a disturbance observer.

Description of Related Art

Backpack is a common means for carrying loads in daily life. Carrying a heavy load for a long time will cause harm to human body and result in great metabolic energy consumption. Carrying loads is particularly common in soldiers marching, hiking, and the like. Soldiers might carry up to 50 to 60 kg of heavy loads during marching for up to several hours or even more than ten hours. It is often necessary to carry a few kilograms to tens of kilograms of loads for several hours during hiking, which leads to increased metabolic rate, increased muscle activity and muscle fatigue and limits the scope of activities. In the meantime, a heavy backpack may also increase the risk of musculoskeletal damage. For such circumstances, the disclosure provides a powered backpack that assists human to carry loads. The powered backpack can adjust the acceleration fluctuation of the load in the vertical direction, which can reduce the inertial force of the load, making it easier for people to carry loads with less metabolic consumption.

At present, there is difficulty in controlling acceleration of the load in vertical direction for powered backpack. Since the human motion causes great interference to the powered backpack, the load acceleration is often affected by the human motion, consequently the acceleration tracking and control effect is poor, and which affects the backpack in assisting performance.

SUMMARY

Technical Problem

In view of the above defects or needs for improvement of the related art, the disclosure provides an acceleration control method for the load on the powered backpack based on a disturbance observer, which uses feedback linearization and analyzing method based on frequency domain to identify the friction model and a second-order linear model of the powered backpack, and provides a design method for disturbance observer. The control method can effectively overcome the interference caused to the system, enhance the dynamic response and acceleration tracking accuracy of the system while ensuring the effectiveness of the powered backpack in assisting performance.

To achieve the above purpose, the disclosure provides an acceleration control method for a load on a powered backpack based on a disturbance observer. The method includes the following steps:

S1 Set a desired acceleration of the load on the powered backpack, preset the initial motor drive current according to the desired acceleration, and the load begins to move under the drive of the current, and measure the actual acceleration of the load;

S2 Establish a disturbance observer for acceleration control of the load on the powered backpack, and use the disturbance observer to calculate the motor drive current that makes the actual acceleration of the load to be equal to the desired acceleration, thereby achieving acceleration control of the load on the powered backpack, wherein the disturbance observer is operated according to the following calculation formula:

$$i_o = i_{cmd} - i_D + i_f$$

Specifically, $i_o$ is the motor drive current, $i_{cmd}$ is the command drive current, that is, the sum of the command currents generated by feedback control and feedforward control, $i_D$ is the corresponding drive current overcoming the disturbance, and $i_f$ is the friction compensation current, that is, the drive current required to eliminate the influence of the friction force.

More specifically, in step S2, the observer calculates the corresponding drive current $i_D$ overcoming the disturbance for solution according to the following calculation formula:

$$i_D = \tilde{i} - i_{cmd}$$

Specifically, $\tilde{i}$ is the theoretical value of the command drive current required for the actual acceleration of the load.

More specifically, in step S2, the $\tilde{i}$ obtains the solution according to the following calculation formula:

$$\tilde{i} = \mathcal{L}^{-1}[G^{-1}(s)F(s)X_{sl}(s)s^2]$$

Specifically, $X_{sl}(s)s^2 = \mathcal{L}[\ddot{x}_{sl}]$, $\ddot{x}_{sl}$ is the actual acceleration of the measured load, $\mathcal{L}$ is the Laplace transform, $\mathcal{L}^{-1}$ is the inverse Laplace transform, s is the complex frequency, $G^{-1}(s)$ is the inverse of the second-order linear model of the powered backpack, and F(s) is a low-pass filter.

More specifically, in step S2, the $i_{cmd}$ obtains solution according to the following calculation formula:

$$i_{cmd} = i_{ff} + i_{PID}$$

$$i_{ff} = k_{ff}\mathcal{L}^{-1}[G^{-1}(s)F(s)X_r(s)s^2]$$

$$i_{PID} = k_p err + k_i \int err\, dt + k_d \frac{derr}{dt}$$

Specifically, $i_{ff}$ is the command current of the feedforward term, $k_{ff}$ is the adjustable feedforward coefficient, $X_r(s)s^2 = \mathcal{L}[\ddot{x}_r]$, the feedforward term is obtained from the calculation of the desired acceleration, $i_{PID}$ is the command current of the PID feedback term, and the load acceleration tracking deviation iserr=$\ddot{x}_r - \ddot{x}_{sl}$.

More specifically, in step S2, the friction force model includes viscous friction and Coulomb friction, and the friction compensation current $i_f$ is calculated according to the following formula:

$$i_f = \frac{k_v \dot{x}_l + k_c \text{sgn}(\dot{x}_l)}{k_{bs}}$$

Specifically, $k_v$ is the viscous friction coefficient, $k_c$ is the Coulomb friction coefficient, $\dot{x}_l$ is the first-order derivative of the displacement of the load on the backpack, that is, the speed, $k_{bs}$ is the coefficient between the motor drive current and the driving force.

More specifically, the G(s) obtains the solution according to the following:

(1) Establish a second-order linear model of the powered backpack. The input of the second-order linear model is the command drive current in the motor drive current, and the model output is the actual acceleration of the load on the powered backpack. In establishing the second-order linear model, the motor drive current includes the command drive current and friction compensation current, the second-order linear model is as follows:

$$G(s) = \frac{d}{as^2 + bs + c}$$

Specifically, s is the complex frequency; a, b, c and d are model parameters to be identified.

(2) A sinusoidal current of different frequencies is adopted as the command drive current to operate together with the friction compensation current to drive the motor to generate a driving force. The amplitude and phase of the sinusoidal current are obtained. The actual acceleration of the load under the sinusoidal current signal is measured and collected, so as to obtain the amplitude-frequency and phase-frequency relationship between the sinusoidal current and the actual acceleration of the load at different frequencies.

(3) According to the amplitude-frequency and phase-frequency relationship obtained in step (2), fit the second-order linear model in step (1) to obtain the G(s).

More specifically, the $k_{bs}$, $k_v$, and $k_c$ are calculated and obtained in the following manner:

(1) Place the powered backpack horizontally, remove the elastic rope, and control the movement of the load at a constant speed by the motor. Under the circumstances, the active force generated by the motor and the friction force have the following relationship when operating together:

$k_{bs}i - k_v\dot{x}_l - k_c \text{sgn}(\dot{x}_l) = 0$

Specifically, $\dot{x}_l$ is the first-order derivative of the displacement of the load on the backpack, that is, speed, $k_{bs}$ is the coefficient between the motor drive current and the driving force, $k_v$ is the viscous friction coefficient, $k_c$ is the Coulomb friction coefficient, i is the motor drive current.

(2) Fit $k_{bs}$, $k_v$, and $k_c$ parameters through least squares method by collecting data i and $\dot{x}_l$. Generally speaking, the above technical solutions provided by the disclosure have the following effects compared with the related art:

1. The disclosure requires an accurate model of the powered backpack when establishing the observer. Considering that the friction force is the main part of the non-linear part in the system model, a friction model is established and its parameters are identified through experimental methods. According to the friction force model, the motor generates the driving force that is equal to the friction force and in the opposite direction to eliminate the influence of the friction force, so that the system can be approximated as a linear model, which facilitates design and realization of control algorithms. Meanwhile, the parameters of the linear model are identified through experimental methods, which provides a basis for the realization of disturbance observer.

2. The disclosure is mainly directed to the problem of poor load acceleration control effect, which is caused by the interference of the human motion, of the powered backpack that assist human to carry load, and provides a closed-loop acceleration control method based on disturbance observer, which effectively improves the control accuracy of the system, so that the system has better robustness and dynamic response, which ensures the effectiveness of powered backpack in assisting performance and reduces the metabolic energy consumption under carrying loads tasks.

3. The control method based on the disturbance observer provided by the disclosure achieves higher tracking accuracy for acceleration control. The control method has a simple structure, is convenient to implement, and has a high practical value.

BRIEF DESCRIPTION OF THE DRAWINGS

In all drawings, the same reference numerals are used to denote the same elements or structures.

DESCRIPTION OF THE EMBODIMENTS

In order to make the purposes, technical solutions and advantages of the disclosure more comprehensible, the disclosure will be further described in detail below with reference to the accompanying drawings and embodiments. It should be understood that the specific embodiments described herein are only used to explain the disclosure, and are not intended to limit the disclosure. In addition, the technical features involved in the various embodiments of the disclosure described below can be combined with each other as long as there is no conflict with each other.

Figure 3:
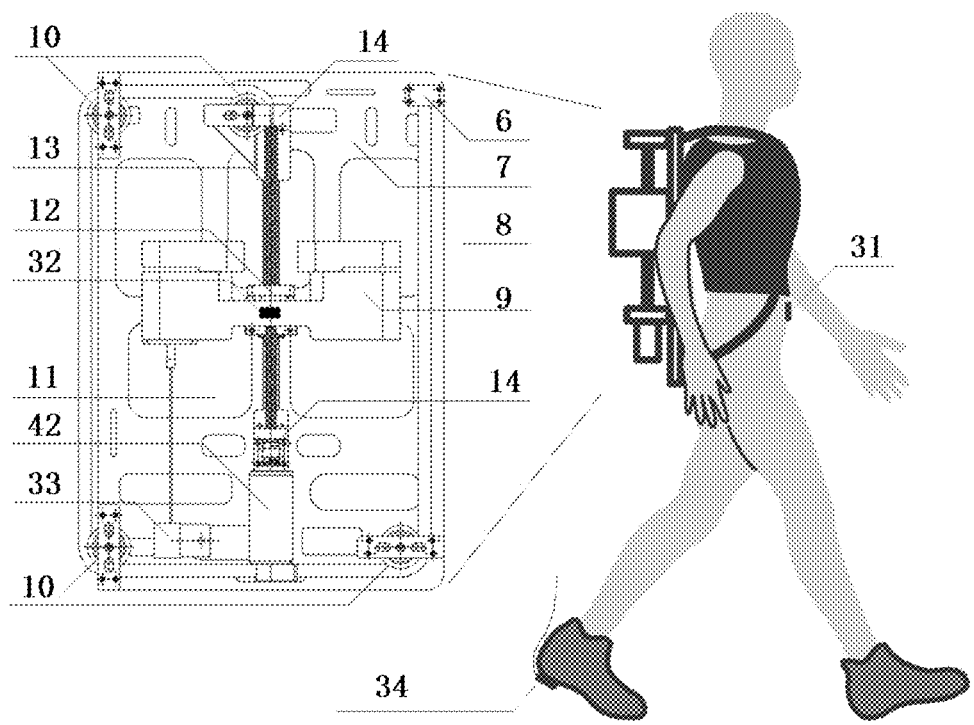
FIG. 3 illustrates a powered backpack that assists the human to walk with loads and is constructed according to an embodiment of the disclosure.

As shown in FIG. 3, a powered backpack for assisting human to walk with load is illustrated. The system includes a base plate 7 and a load 9, a ball screw 13, an elastic rope 8, a data acquisition module, a motion control module, a power supply, a controller and a mode switching button provided on the base plate, wherein:

The ball screw 13 is provided in the center of the base plate 7, the load 9 is provided on the ball screw and moves up and down along the ball screw 13 under the driving of the motion control module. One end of the elastic rope 8 is fixed on the base plate, and the other end is connected to the load through the pulleys 10. Through the traction of the elastic rope on the load, it is possible to balance the gravity of the load in the vertical direction.

The power supply is connected to the data acquisition module and the motion control module, respectively supplying power to the data acquisition module and the motion control module. The data acquisition module and the motion control module are simultaneously connected to the controller. When the human starts walking with the powered backpack on the back, the mode switching button is used to control the powered backpack to enter an acceleration tracking control mode. In this mode, the data acquisition module collects the acceleration of human body in the vertical direction, and transmits the collected acceleration to the controller. The controller sets the desired acceleration of the load in the vertical direction according to the acceleration, and makes the motion control module to drive the load 9 to move at the desired acceleration on the ball screw 13. When the human stop walking, the mode switching button is used to control the powered backpack to enter the position control mode. In this mode, the data acquisition module collects the position of the load and transmits the position of the load to the controller. The controller makes the load to stay on the ball screw through the motion control module.

The motion control module includes a motor driver and a servo motor 42. The servo motor 42 is fixed on the support block 14 and connected to the coupler 11, and transmits the active force to the load 9 through the coupler 11, the ball screw 13, and the nut 12 in sequence, thereby adjusting the acceleration of the load to track the desired acceleration, thereby reducing the human metabolic energy consumption during load-carrying walking with the powered backpack. The motor driver works in the current mode, drives the servo motor 42 to generate a corresponding amount of torque according to the received motor drive current signal, and the driving force is transmitted to the load through the ball screw.

The controller is configured to read all sensor data, after calculation by the control algorithm, the motor drive current signal is transmitted to the motion control module, and the data is transmitted to the upper computer through the communication module. After the motion control module receives the motor drive current signal, the driving motor generates the corresponding amount of driving force, and then the movement of the load is controlled through the transmission mechanism such as ball screw.

Figure 2:
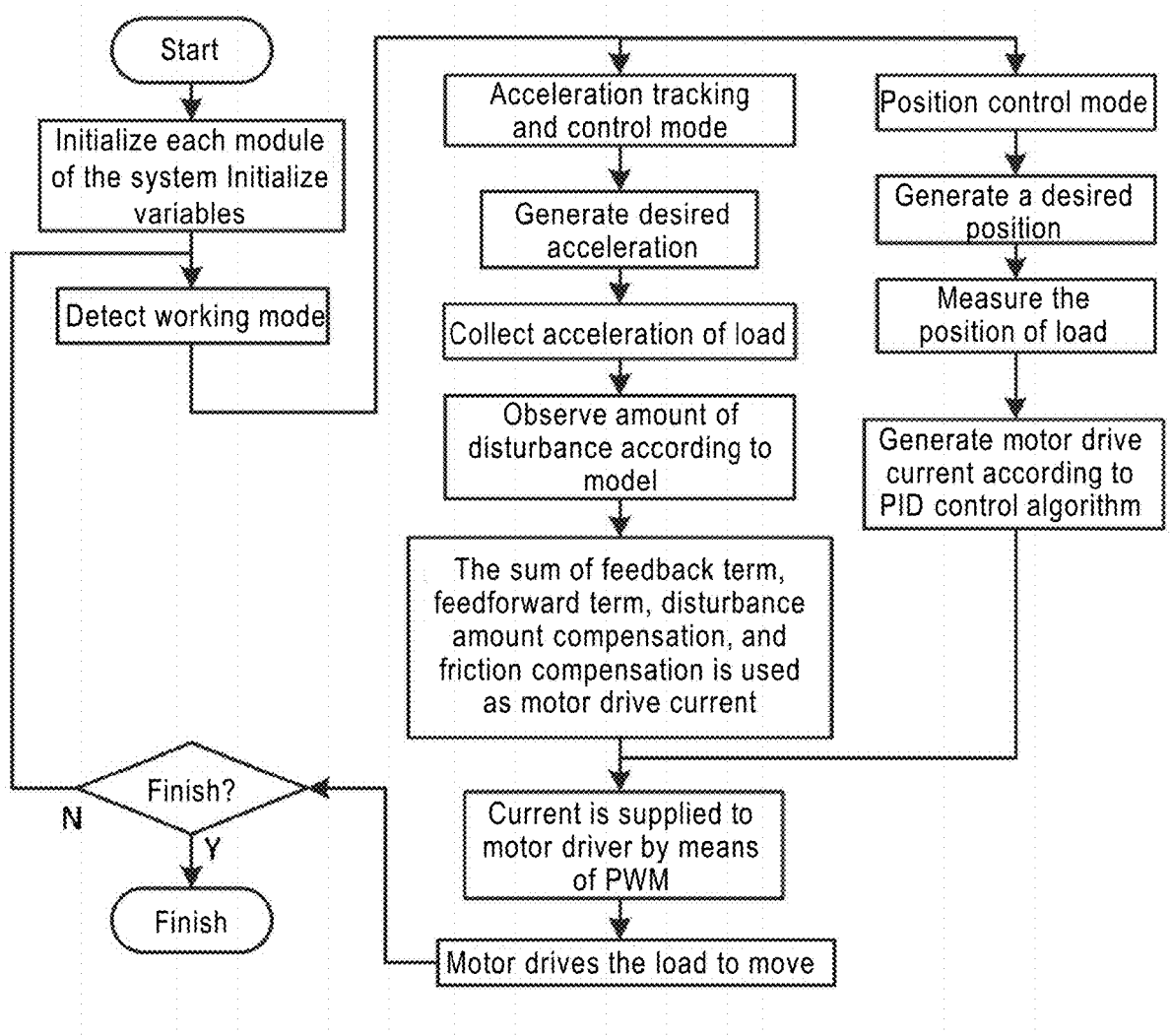
FIG. 2 is a flow chart of the normal operation of the powered backpack constructed according to the embodiment of the disclosure.

As shown in FIG. 2, the process shown in FIG. 2 is adopted when the powered backpack is working normally. The steps are as follows:

(a) Initialize each module of the controller and assign initial values to the variables;

(b) The acceleration tracking control mode of the system is controlled by the mode switching button, the system includes two modes, which are position control mode and acceleration tracking control mode, respectively.

(c) In the position control mode, the PID control algorithm is adopted to control the load to return to the middle position of the ball screw, the position deviation between the actual position and the desired position is calculated, and the PID control algorithm is adopted to calculate the motor drive current so that the actual position of the load is close to the desired position.

(d) In the acceleration tracking control mode, the acceleration control method based on the disturbance observer provided in the disclosure is adopted to implement acceleration tracking control, specifically as follows:

S1 Establish the model of the powered backpack, including the friction model and the second-order linear model, and identify the friction model parameters and the second-order linear model parameters through the experimental method.

S2 Switch to acceleration tracking control mode through the mode switching button, the controller generates the desired acceleration, and measures the acceleration of the load as the feedback signal.

Figure 1:
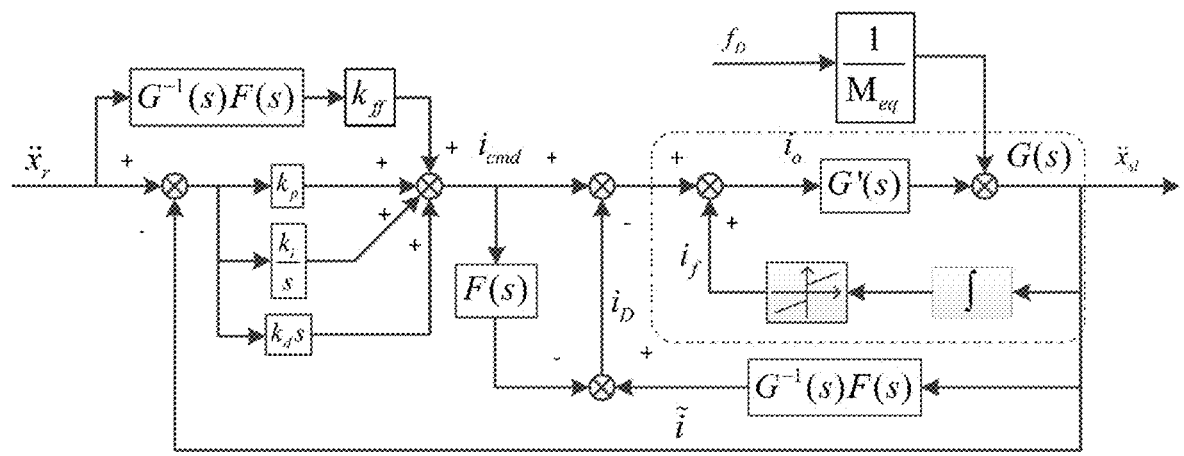
FIG. 1 is a control block diagram of an acceleration control algorithm based on a disturbance observer constructed according to an embodiment of the disclosure.

S3 As shown in FIG. 1, an acceleration control method based on a disturbance observer is constructed, the disturbance observer is adopted to calculate the drive current required to overcome the disturbance, that is, the disturbance term, a feedforward term is generated based on the desired acceleration, and a feedback term is generated based on the deviation of acceleration tracking. The friction compensation current is calculated according to the movement state of the load and the identified friction model parameters, that is, the friction compensation term, which compensates the friction force in the actual system, and the feedforward term, feedback term, friction compensation term, and disturbance term constitute the motor drive current signal. The corresponding amount of motor drive current generated by the motor driver is controlled by the PWM wave, that is, the magnitude of the torque generated by the motor is regulated, and the actual acceleration of the load is adjusted by the motor drive current so that the actual acceleration is equal to the desired acceleration as much as possible, thereby realizing acceleration tracking control of the load.

Furthermore, the friction model and the second-order linear model of the powered backpack in step S1 are specifically as follows:

Establish a friction model which consists of Coulomb friction and viscous friction:

$$f = k_v \dot{x}_l + k_c \, \text{sgn}(\dot{x}_l) \tag{1}$$

Establish a second-order linear model. The friction force causes the nonlinearity of the system. The actual system containing the nonlinear part is represented by G'(s). After eliminating the influence of the friction force, the powered backpack can be approximated as a second-order linear system G(s). The second-order linear model may be expressed through transfer function:

$$G(s) = \frac{d}{as^2 + bs + c} \tag{2}$$

Specifically: f is the friction force, $\dot{x}_l$ represents the first-order derivative of the displacement of the load on the backpack, that is, the speed, $k_v$ represents the viscous friction coefficient, $k_c$ represents the Coulomb friction coefficient, G(s) represents the second-order linear model after eliminating the nonlinear effects caused by the friction force. The common machinery system can be regarded as a second-order system in a limited frequency band. The parameters, $k_v$, $k_c$, a, b, c and d are identified through experimental methods.

The identification method for the friction model is as follows:

When identifying the friction model by the experimental method, the powered backpack is placed horizontally, the elastic rope is removed, and the load is controlled by the motor to move at a constant speed. Under the circumstances, the active force generated by the motor and the friction force work together to move the load and the motor rotor at a constant speed, that is, the load acceleration is almost zero, $\ddot{x}_l \approx 0$, and has the following relationship:

$$k_{bs} i - f = M_{eq} \ddot{x}_l \approx 0$$

$$f = k_v \dot{x}_l + k_c \, \text{sgn}(\dot{x}_l)$$

that is:

$$k_{bs} i - k_v \dot{x}_l - k_c \, \text{sgn}(\dot{x}_l) = M_{eq} \ddot{x}_l \approx 0 \tag{3}$$

Specifically: $\ddot{x}_l$ represents the second-order derivative of the displacement of the load on the backpack. Under the circumstances, because the powered backpack is placed in a static state, the measured load acceleration $\ddot{x}_{sl}$ is equal to $\ddot{x}_l$; $k_{bs}$ represents the coefficient between the motor drive current and the driving force, i represents the motor drive current, $M_{eq}$ is the theoretically calculated equivalent mass of the load and the motor rotor of at the load end. Through collection of data i and $\dot{x}_l$, according to formula (3), the least squares method is used to fit the $k_{bs}$, $k_v$, and $k_c$ parameters.

For the identification of the second-order linear model of the powered backpack, it is required to perform friction compensation first, that is, the friction force is eliminated by the driving force of the motor, and the non-linear actual system is transformed into a linear system that is easy to model, then the frequency scanning method is adopted to obtain a linear model of the system, that is, the transfer function. The specific method is: sinusoidal currents of different frequencies are adopted as the input signal of the system, and the sinusoidal currents work together with the friction compensation current to drive the motor to generate driving force, the acceleration signal of the load under this input signal is measured and collected. In this manner, the amplitude-frequency and phase-frequency relationship between sinusoidal current and load acceleration at different frequencies can be obtained. The Matlab system identification toolbox is adopted to fit these discrete amplitude-frequency and phase-frequency data into the transfer function, i.e., G(s).

Furthermore, in step S3, the specific steps are:

The load speed signal $\dot{x}_l$ can be obtained according to the differential position data obtained by the load drive motor encoder, and the generated friction compensation current $i_f$ is:

$$i_f = \frac{k_v \dot{x}_l + k_c \text{sgn}(\dot{x}_l)}{k_{bs}} \quad (4)$$

The control algorithm uses the feedforward term and the feedback term to generate the command drive current $i_{cmd}$. The feedforward term is generated according to the desired acceleration, and the feedback term generated by the proportional-integral-derivative (PID) controller according to the deviation of the measured actual acceleration of the load and the desired acceleration.

$$i_{cmd} = i_{ff} + i_{PID} \quad (5)$$

The feedforward term $i_{ff}$ is generated based on the desired acceleration signal $\ddot{x}_r$ of the load.

$$i_{ff} = k_{ff} \mathcal{L}^{-1}[G^{-1}(s)F(s)X_r(s)s^2] \quad (6)$$

Specifically, $\mathcal{L}$ is the Laplace transform, $\mathcal{L}^{-1}[\ ]$ is the inverse Laplace transform, s is the complex frequency, $X_r(s)s^2 = \mathcal{L}[\ddot{x}_r]$, $\ddot{x}_r$ is the desired acceleration, $k_{ff}$ is the adjustable feedforward coefficient, $G^{-1}(s)$ is the inverse of the second-order linear model of the powered backpack, and F(s) represents a low-pass filter. The non-causal system $G^{-1}(s)$ that is not physically achievable is converted into a causal system $G^{-1}(s)F(s)$ that is physically achievable.

The feedback term $i_{PID}$ is obtained by the proportional-integral-derivative (PID) controller according to the deviation of the desired acceleration $\ddot{x}_r$ of the load and the measured actual acceleration $\ddot{x}_{sl}$.

$$i_{PID} = k_p err + k_i \int err\, dt + k_d \frac{derr}{dt} \quad (7)$$

Specifically, $K_p$, $K_i$ and $K_d$ respectively represent proportional, integral, and differential coefficients, and the load acceleration tracking deviation is expressed as err=$\ddot{x}_r - \ddot{x}_{sl}$.

The steps of using the disturbance observer: the actual acceleration $\ddot{x}_{sl}$ of the measured load, of which Laplace transform is $X_{sl}(s)s^2$, the theoretical value of the command drive current required for the actual acceleration of the load is $\tilde{i}$:

$$\tilde{i} = \mathcal{L}^{-1}[G^{-1}(s)F(s)X_{sl}(s)s^2] \quad (8)$$

Specifically, $X_{sl}(s)s^2 = \mathcal{L}[\ddot{x}_{sl}]$, $\ddot{x}_{sl}$ is the measured actual acceleration of the load.

The actual acceleration of the load is generated by the combination of the active force generated by the motor and the disturbance received by the system, that is, the theoretical value of the command drive current required for the measured actual acceleration of the load consists of the command drive current $i_{cmd}$ calculated by the controller in real time and the corresponding drive current $i_D$ overcoming disturbance. Written in the form of current, the drive current corresponding to the observed disturbance is:

$$i_D = \tilde{i} - i_{cmd} \quad (9)$$

The motor drive current calculated by the control algorithm is:

$$i_o = i_{cmd} - i_D + i_f \quad (10)$$

Those skilled in the art can easily understand that the above are only preferred embodiments of the disclosure and are not intended to limit the disclosure. Any modification, equivalent replacement and improvement made within the spirit and principle of the disclosure should fall within the scope of the disclosure.

What is claimed is:

1. An acceleration control method for a load on a powered backpack based on a disturbance observer, comprising the following steps:

S1 setting a desired acceleration of the load on the powered backpack, presetting an initial motor drive current according to the desired acceleration, and the load begins to move under driving of the initial motor drive current, and measuring the actual acceleration of the load;

S2 establishing the disturbance observer for acceleration control of the load on the powered backpack, and utilizing the disturbance observer to calculate a motor drive current that makes an actual acceleration of the load to be equal to the desired acceleration, thereby achieving acceleration control of the load on the powered backpack, wherein the disturbance observer is operated according to the following calculation formula:

$$i_o = i_{cmd} - i_D + i_f$$

wherein $i_o$ is the motor drive current, $i_{cmd}$ is a command drive current, that is, the sum of command currents generated by feedback control and feedforward control, $i_D$ is a corresponding drive current overcoming the disturbance, and $i_f$ is a friction compensation current, that is, a drive current required to eliminate the influence of a friction force.

2. The acceleration control method for the load on the powered backpack based on the disturbance observer according to claim 1, wherein in step S2, the disturbance observer calculates the corresponding drive current $i_D$ overcoming the disturbance for solution according to the following calculation formula:

$$i_D = \tilde{i} - i_{cmd}$$

wherein $\tilde{i}$ is a theoretical value of the command drive current required for the actual acceleration of the load.

3. The acceleration control method for the load on the powered backpack based on the disturbance observer according to claim 1, wherein in step S2, the $\tilde{i}$ obtains the solution according to the following calculation formula:

$$\tilde{i} = \mathcal{L}^{-1}[G^{-1}(s)F(s)X_{sl}(s)s^2]$$

wherein $X_{sl}(s)s^2 = \mathcal{L}[\ddot{x}_{sl}]$, $\ddot{x}_{sl}$ is the actual acceleration of the measured load, $\mathcal{L}$ is Laplace transform, $\mathcal{L}^{-1}$ is inverse Laplace transform, s is a complex frequency, $G^{-1}(s)$ is an inverse of a second-order linear model of the powered backpack, and F(s) is a low-pass filter.

4. The acceleration control method for the load on the powered backpack based on the disturbance observer according to claim 1, wherein in step S2, the $i_{cmd}$ obtains solution according to the following calculation formula:

$$i_{cmd} = i_{ff} + i_{PID}$$

$$i_{ff} = k_{ff}\mathcal{L}^{-1}\left[G^{-1}(s)F(s)X_r(s)s^2\right]$$

$$i_{PID} = k_p err + k_i \int err\, dt + k_d \frac{derr}{dt}$$

wherein $i_{ff}$ is a command current of a feedforward term, $k_{ff}$ is an adjustable feedforward coefficient, $X_r(s)s^2 = \mathcal{L}[\ddot{x}_r]$, the feedforward term is obtained from the calculation of the desired acceleration, $i_{PID}$ is a command current of a PID feedback term, and a load acceleration tracking deviation is $err = \ddot{x}_r - \ddot{x}_{sl}$.

5. The acceleration control method for the load on the powered backpack based on the disturbance observer according to claim 1, wherein in step S2, a friction force model comprises viscous friction and Coulomb friction, and a friction compensation current $i_f$ is calculated according to the following formula:

$$i_f = \frac{k_v \dot{x}_l + k_c \mathrm{sgn}(\dot{x}_l)}{k_{bs}}$$

wherein $k_v$ is a viscous friction coefficient, $k_c$ is a Coulomb friction coefficient, $\dot{x}_l$ is a first-order derivative of displacement of the load on the backpack, that is, speed, $k_{bs}$ is a coefficient between the motor drive current and a driving force.

6. The acceleration control method for the load on the powered backpack based on the disturbance observer according to claim 3, where in the G(s) obtains the solution according to the following:

(1) establishing a second-order linear model of the powered backpack, an input of a second-order linear model is a command drive current in the motor drive current, and the second-order linear model output is an actual acceleration of the load on the powered backpack, in establishing the second-order linear model, the motor drive current comprises a command drive current and a friction compensation current, the second-order linear model is as follows:

$$G(s) = \frac{d}{as^2 + bs + c}$$

wherein s is a complex frequency; a, b, c and d are model parameters to be identified, (2) a sinusoidal current of different frequencies is adopted as a command drive current to operate together with the friction compensation current to drive the motor to generate a driving force, the amplitude and the phase of the sinusoidal current are obtained, the actual acceleration of the load under the sinusoidal current signal is measured and collected, so as to obtain an amplitude-frequency and phase-frequency relationship between the sinusoidal current and the actual acceleration of the load at different frequencies;

(3) according to the amplitude-frequency and phase-frequency relationship obtained in step (2), fit the second-order linear model in step (1) to obtain the G(s).

7. The acceleration control method for the load on the powered backpack based on the disturbance observer according to claim 5, wherein the $k_{bs}$, $k_v$ and $k_c$ are calculated and obtained in the following manner:

(1) place the powered backpack horizontally, remove an elastic rope, and control the movement of the load at a constant speed by the motor, under the circumstances, the active force generated by the motor and a friction force have the following relationship when operating together:

$$k_{bs}i - k_v\dot{x}_l - k_c\,\mathrm{sgn}(\dot{x}_l) = 0$$

wherein $\dot{x}_l$ is a first-order derivative of displacement of the load on the backpack, that is, speed, $k_{bs}$ is a coefficient between the motor drive current and the driving force, $k_v$ is the viscous friction coefficient, $k_c$ is the Coulomb friction coefficient, i is the motor drive current;

(2) fit $k_{bs}$, $k_v$ and $k_c$ parameters through least squares method by collecting data i and $\dot{x}_l$.

\* \* \* \* \*